Patented Feb. 14, 1933

1,897,575

UNITED STATES PATENT OFFICE

MELVIN DE GROOTE, OF ST. LOUIS, LOUIS T. MONSON, OF MAPLEWOOD, AND ARTHUR F. WIRTEL, OF WEBSTER GROVES, MISSOURI, ASSIGNORS, BY MESNE ASSIGNMENTS, TO TRETOLITE COMPANY, OF WEBSTER GROVES, MISSOURI, A CORPORATION OF MISSOURI

PROCESS FOR BREAKING PETROLEUM EMULSIONS

No Drawing. Application filed January 21, 1929. Serial No. 334,106.

This invention relates to the treatment of emulsions of mineral oil and water, such as petroleum emulsions, for the purpose of separating the oil from the water.

Petroleum emulsions are of the water-in-oil type and comprise fine droplets of naturally-occurring waters or brines, dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent or demulsifying agent used in our process is a substituted aromatic sulfonic body of the type $XRR^1SO_3Z$, wherein X stands for a bicyclic aromatic nucleus and $RR^1$ stands for more than one alcohol residue derived from an alcohol or alcohols having fewer than twelve carbon atoms in the molecule, $SO_3$ is the sulfonic residue, and Z is an hydrogen ion equivalent of the kind subsequently defined, said treating agent being also characterized by the fact that in concentrations of not over 1%, it will produce a precipitate when diluted with an excess of an aqueous solution of alkaline earth salts.

The treating agent or demulsifying agent above described is produced or obtained by introducing alcohol residues having fewer than twelve carbon atoms each, into a bicyclic nucleus. Instead of the unaltered bicyclic aromatics, derivatives may be employed, such as halogen derivatives, nitro derivatives, hydroxy derivatives, or hydrogenated derivatives. If desired, the sulfonic group may be introduced into the bicyclic body before the introduction of an alcohol residue of the kind described; for instance, naphthalene sulfonic acid or naphthalene disulfonic acid or beta naphthol sulfonic acid may be employed.

In manufacturing said treating agent alcohol residues of the kind described can be introduced into the aromatic nucleus by three well-known methods. One method depends on the fact that these alcohols can be condensed with bicyclic aromatics by treating them with strong sulfonating agents, such as sulfuric acid, oleum, or chloro-sulfonic acid, preferably in excess at elevated temperatures, and especially in the presence of a small quantity of a phosphorus compound, such as phosphoric acid, phosphorus pentachloride, or phosphorus oxychloride. During such condensing operation sulfonation of the aromatic body also takes place, thus producing a sulfonated substituted aromatic. Obviously, more than two alcohol residues can be introduced into a bicyclic body, and furthermore more than one sulfonic group can be introduced. It is not necessary that a single alcohol body be used, but two or more different alcohols may be employed; for instance, methyl alcohol, ethyl alcohol, and butyl alcohol.

It should be understood that the above reaction is not limited to the introduction of residues from aliphatic alcohols, but can also be applied to the introduction of a residue from an aromatic alcohol such as hexahydrophenol. Likewise, aralkyl alcohols may be employed, such as benzyl alcohol, or a cyclic alcohol may be employed, such as cyclobutanol. In the introduction of two or more alcohols, as noted, they need not be of the same kind; for instance, one may be an alkyl alcohol, such as propyl alcohol, and the other may be an aromatic alcohol, such as hexahydrophenol, or else one may be an aralkyl alcohol, such as benzyl alcohol and the other may be a cyclo-alcohol such as cyclobutanol.

Another method of producing the treating agent used in our process is to employ the well-known Friedel and Craft's reaction for introducing a substitution residue into an aromatic. Methyl alcohol may be converted by action of a suitable phosphorus halogen compound into a suitable methyl halide such as methyl chloride. This material can be treated with a bicyclic aromatic of the kind above described in the presence of anhydrous aluminum chloride to give the substituted aromatic. Said aromatic can be subsequently sulfonated to give a substituted aromatic sulfonic body of the kind described in the preceding procedure. This second procedure, namely, that of Friedel and Craft, will not be described further, because it is possibly the best known reaction of aromatic chemistry.

Still another method that may be used to produce our treating agent is to dissolve the aromatic such as naphthalene or tetralin in an excess of sulfuric acid or other suitable sulfonating agent and pass into same a material such as ethylene, propylene, butylene, or amylene.

While various procedures may be used to produce the material that is employed as the treating agent of our process, we prefer to produce said material by complete reaction of two moles of propyl alcohol and one mole of amyl alcohol and one mole of naphthalene in the presence of a large excess of 66° sulfuric acid preferably at a temperature above the melting point of naphthalene. Said reaction is continued until at least two and preferably three alcohol groups are introduced into the bicyclic nucleus with a simultaneous introduction of one sulfonic group. The reaction involving the introduction of the sulfonic group, of course, is well understood. The introduction of the propyl groups and the amyl group depends on the formation of propyl (or amyl) acid sulfate with the splitting out of water. Said propyl (or amyl) acid sulfate, under conditions described, reacts with the bicyclic body to yield the desired material. When sulfonation is complete, the mass is diluted with water until an upper layer separates. The upper layer is drawn off and neutralized with any suitable base such as caustic soda, caustic potash, or ammonia. We prefer to use ammonia. The material produced by the above procedure is tested for the production of insoluble alkaline earth salts. For example, a 1% solution of said material may be mixed with a 1% solution of magnesium sulfate, and heated for 10 to 30 minutes in a water bath just below the boiling point of water, if required. In the test with either the calcium salt or the magnesium salt, a precipitate should be obtained which remains after the mixture is diluted with two times its volume of distilled water.

The said material can be employed as an acid mass to treat the emulsion, but this is not desirable, due to its corrosive effect. There is no objection to an excess of alkali if desired. The material can also be converted into an ester by esterification in the usual manner to produce an aromatic or aliphatic ester such as the ethyl ester. Some of the esters so produced may be oil-soluble, such as the hexyl ester.

As indicated, the said material may be acidic in nature, and the complex substituted aromatic sulfonic group may be united with an acid hydrogen ion, as is the case when the acid itself is employed. When said acidic material is neutralized, the hydrogen ion is replaced by a suitable metallic ion or its equivalent, such as a true metallic ion or an ammonium radical. In the event that said material is esterified, the hydrogen ion is replaced by an organic radical such as an ethyl radical. We will refer to the hydrogen ion or its metallic substitute or its organic substitute as the hydrogen ion equivalent.

Material of the kind above described can be used as a demulsifying agent in an anhydrous state or in solutions of any convenient strength. A concentrated solution of said material can be emulsified into oil by agency of any suitable oil-soluble emulsifier such as calcium oleate and used in this condition to treat the emulsion. Said material can be used alone to form the demulsifying agent of our process or it can be combined with other well-known treating agents for petroleum emulsions of the water-in-oil type, such as water softeners, modified fatty bodies or their soaps, petroleum sulfonic acids or their soaps, or other substances having similar properties.

In manufacturing or producing the treating agent employed in our process, we contemplate using only substances of the above class that yield insoluble precipitates with either soluble calcium or soluble magnesium salts, and we contemplate using only alcohols having fewer than twelve carbon atoms.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readiy to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent is:

1. A process for breaking a petroleum emulsion of the water-in-oil type, which consists in subjecting the emulsion to the action of a demulsifying agent containing a substituted bicyclic aromatic sulfonic body of the type $XRR^1SO_3Z$, wherein X is a bicyclic aromatic nucleus; $RR^1$ represents not fewer than two alcohol residues derived from alcohols having fewer than twelve carbon atoms each; $SO_3$ represents the conventional sulfonic acid residue; and Z represents an hydrogen ion equivalent, said demulsifying agent being also characterized by the fact that in concentrations of not over 1%, it will produce a precipitate when diluted with an excess of an aqueous solution of alkaline earth salts.

2. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents not fewer than two alcohol residues derived from alcohols having fewer than twelve carbon atoms each; $SO_3$ represents the conventional sulfonic acid residue; and Z represents an hydrogen ion equivalent, said demulsifying agent being also characterized by the fact that in concentrations of not over 1%, it will produce a precipitate when diluted when an excess of an aqueous solution of alkaline earth salts.

3. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$; wherein X is a bicyclic aromatic nucleus; $RR^1$ represents not fewer than two alcohol residues derived from alcohols having fewer than 12 carbon atoms each; $SO_3$ represents the conventional sulfonic acid residue, and Z represents a metallic ion equivalent, said demulsifying agent being also characterized by the fact that in concentrations of not over 1%, it will produce a precipitate when diluted with an excess of an aqeous solution of alkaline earth salts.

4. A process for breaking a petroleum emulsion of the water-in-oil type which consists in subjecting the emulsion to the action of a demulsifying agent containing a water-soluble substituted bicyclic aromatic sulfonic body of the type $XRR^1SO_3Z$; wherein X is a bicyclic aromatic nucleus; $RR^1$ represents not fewer than two alcohol residues derived from alcohols having fewer than twelve carbon atoms each; $SO_3$ represents the conventional sulfonic acid residue; and Z represents an ammonium radical, said demulsifying agent being also characterized by the fact that in concentrations of not over 1% it will produce a precipitate when diluted with an an excess of an aqeous solution of alkaline earth salts.

5. A process for breaking a petroleum emulsion of the water-in-oil type, which consists in subjecting the emulsion to the action of a demulsifying agent containing a substituted bicyclic aromatic sulfonic body of the type $XRR^1SO_3Z$, wherein X is a bicyclic aromatic nucleus; $RR^1$ represents two alcohol residues derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

6. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two alcohol residues derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

7. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two alcohol residues derived from alcohols having fewer than twelve carbon atoms each; $SO_3$ represents the conventional sulfonic acid residue, and Z represents a metallic ion equivalent, said demulsifying agent being also characterized by the fact that in concentrations of not over 1%, it will produce a precipitate when diluted with an excess of an aqueous solution of alkaline earth salts.

8. A process for breaking a petroleum emulsion of the water-in-oil type, which consists in subjecting the emulsion to the action of a demulsifying agent containing a water-soluble substituted bicyclic aromatic body of the type $XRR^1SO_3Z$; wherein X is a bicyclic aromatic nucleus; $RR^1$ represents two alcohol residues derived from alcohols having fewer than twelve carbon atoms each; $SO_3$ represents the conventional sulfonic acid residue, and Z represents an ammonium radical, said demulsifying agent being also characterized by the fact that in concentrations of not over 1%, it will produce a precipitate when diluted with an excess of an aqueous solution of alkaline earth salts.

9. A process for breaking a petroleum emulsion of the water-in-oil type, which consists in subjecting the emulsion to the action of a demulsifying agent containing a substituted bicyclic aromatic sulfonic body of the type $XRR^1SO_3Z$; wherein X is a bicyclic aromatic nucleus; $RR^1$ represents two dissimilar alcohol residues derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

10. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two dissimilar alcohol residues derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

11. A process for breaking a petroleum emulsion of the water-in-oil type, which consists in subjecting the emulsion to the action of a demulsifying agent containing a water-soluble substituted bicyclic aromatic sulfonic body of the type $XRR^1CO_3Z$; wherein X is a bicyclic aromatic nucleus; $RR^1$ represents two dissimilar alcohol residues derived from alcohols having fewer than twelve carbon atoms each; $SO_3$ represents the conventional sulfonic acid residue, and Z represents a metallic ion equivalent, said demulsifying agent being also characterized by the fact that in concentrations of not over 1%, it will produce a precipitate when diluted with an excess of an aqueous solution of alkaline earth salts.

12. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$; wherein X is a bicyclic aromatic nucleus; $RR^1$ represents two dissimilar alcohol residues derived from alcohols having fewer than twelve carbon atoms each; $SO_3$ represents the conventional sulfonic acid residue, and Z represents an ammonium radical, said demulsifying agent being also characterized by the fact that in concentrations of not over 1%, it will produce a precipitate when diluted with an excess of an aqueous solution of alkaline earth salts.

13. A process for breaking a petroleum emulsion of the water-in-oil type, which consists in subjecting the emulsion to the action of a demulsifying agent containing a substituted bicyclic aromatic sulfonic body of the type $XRR^1SO_3Z$, wherein X is a bicyclic aromatic nucleus; $RR^1$ represents two dissimilar alcohol residues, at least one of which is an aliphatic alcohol residue, derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

14. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two dissimilar alcohol residues, at least one of which is an aliphatic alcohol residue derived from alcohols having fewer than twelve carbon atoms each; $SO_3$ represents the conventional sulfonic acid residue, and Z represents an hydrogen ion equivalent, said treating agent being also characterized by the fact that in concentrations of not over 1%, it will produce a precipitate when diluted with an excess of an aqueous solution of alkaline earth salts.

15. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$; wherein X is a bicyclic aromatic nucleus; $RR^1$ represents two dissimilar alcohol residues, at least one of which is an aliphatic alcohol residue, derived from alcohols having fewer than twelve carbon atoms each; $SO_3$ represents the conventional sulfonic acid residue, and Z represents a metallic ion equivalent, said demulsifying agent being also characterized by the fact that in concentrations of not over 1%, it will produce a precipitate when diluted with an excess of an aqueous solution of alkaline earth salts.

16. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two dissimilar alcohol residues, at least one of which is an aliphatic alcohol residue, derived from alcohols having fewer than twelve carbon atoms each; $SO_3$ represents the conventional sulfonic acid residue, and Z represents an ammonium radical, said demulsifying agent being also characterized by the fact that in concentrations of not over 1%, it will produce a precipitate when diluted with an excess of an aqueous solution of alkaline earth salts.

17. A process for breaking a petroleum emulsion of the water-in-oil type, which consists in subjecting the emulsion to the action of a demulsifying agent containing a substituted bicyclic aromatic sulfonic body of the type $XRR^1SO_3Z$; wherein X is a bicyclic aromatic body; $RR^1$ represents two dissimilar aliphatic alcohol residues, of which at least one is a propyl alcohol residue, derived from alcohols having fewer than twelve carbon atoms each; $SO_3$ represents the conventional sulfonic acid residue, and Z represents an hydrogen ion equivalent, said demulsifying agent being also characterized by the fact that in concentrations of not over 1%, it will produce a precipitate when diluted with an excess of an aqueous solution of alkaline earth salts.

18. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$, wherein X is a bicyclic aromatic nucleus; $RR^1$ represents two dissimilar aliphatic alcohol residues, of which at least one is a propyl alcohol residue, derived from alcohols having fewer than twelve carbon atoms each; $SO_3$ represents the conventional sulfonic acid residue, and Z represents an hydrogen ion equivalent, said demulsifying agent being also characterized by fact that in concentrations of not over 1%, it will produce a precipitate when diluted with an excess of an aqueous solution of alkaline earth salts.

19. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$; wherein X is a bicyclic aromatic nucleus; $RR^1$ represents two dissimilar aliphatic alcohol residues, of which at least one is a propyl alcohol residue, derived from alcohols having fewer than twelve carbon atoms each; $SO_3$ represents the conventional sulfonic acid residue, and Z represents a metallic ion equivalent, said demulsifying agent being also characterized by the fact that in concentrations of not over 1%, it will produce a precipitate when diluted with an excess of an aqueous solution of alkaline earth salts.

20. A process for breaking a petroleum emulsion of the water-in-oil type, which consists in subjecting the emulsion to the action of a demulsifying agent containing a water-soluble substituted bicyclic aromatic sulfonic body of the type $XRR^1SO_3Z$; wherein X is a bicyclic aromatic nucleus, $RR^1$ represents two dissimilar aliphatic alcohol residues, of which at least one is a propyl alcohol residue, derived from alcohols having fewer than twelve carbon atoms each; $SO_3$ represents the conventional sulfonic acid residue, and Z represents an ammonium radical, said demulsifying agent being also characterized by the fact that in concentrations of not over 1%, it will produce a precipitate when diluted with an excess of an aqueous solution of alkaline earth salts.

MELVIN DE GROOTE.
LOUIS T. MONSON.
ARTHUR F. WIRTEL.

CERTIFICATE OF CORRECTION.

Patent No. 1,897,575. February 14, 1933.

MELVIN DE GROOTE, ET AL.

It is hereby certified that error appears in the printed specification of the above numbered patent requiring correction as follows: Page 3, line 74, claim 2, for "when" read "with"; and that the said Letters Patent should be read with this correction therein that the same may conform to the record of the case in the Patent Office.

Signed and sealed this 9th day of May, A. D. 1933.

(Seal)

M. J. Moore.
Acting Commissioner of Patents.